July 15, 1969  J. MIQUEL  3,455,419
MAGNETIC COUPLING DEVICES
Filed June 20, 1967  2 Sheets-Sheet 1

July 15, 1969   J. MIQUEL   3,455,419
MAGNETIC COUPLING DEVICES
Filed June 20, 1967   2 Sheets-Sheet 2
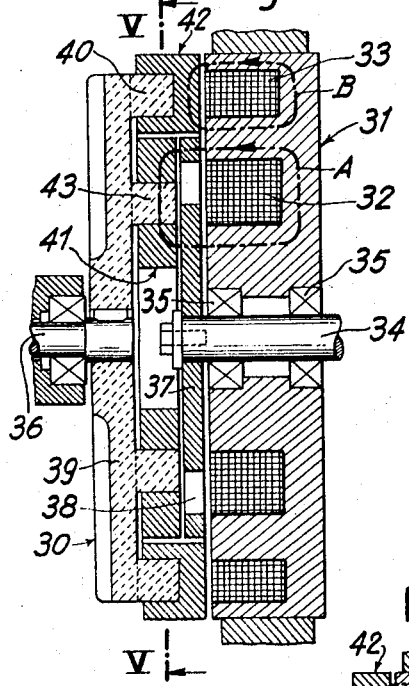
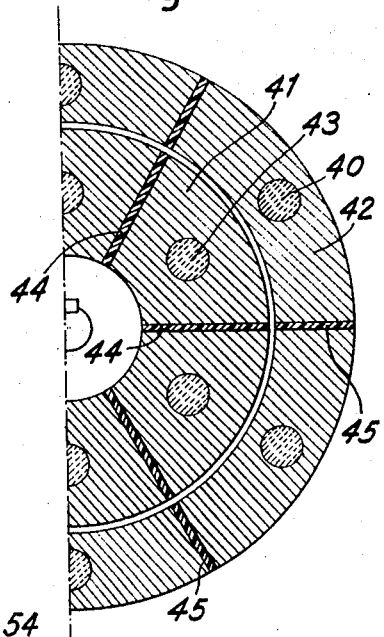
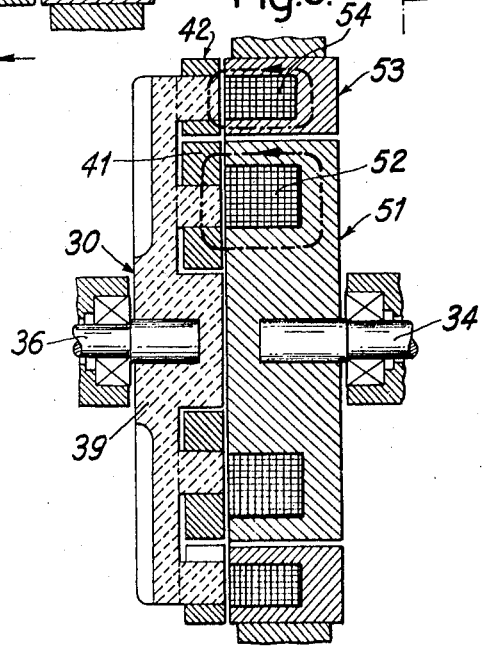

United States Patent Office 3,455,419
Patented July 15, 1969

3,455,419
MAGNETIC COUPLING DEVICES
Joseph Miquel, 7 Rue Semonet, Paris 13, France
Filed June 20, 1967, Ser. No. 647,394
Claims priority, application France, June 22, 1966,
66,376
Int. Cl. H02h *49/00;* F16d *63/00*
U.S. Cl. 188—164                          6 Claims

ABSTRACT OF THE DISCLOSURE

Magnetic coupling device comprising a fixed or rotatably movable electromagnet having at least one annular excitation winding, and at least one annular set of coupling members of ferromagnetic material which are mounted for axial sliding movement on a supporting plate rigid with the shaft of which the velocity of rotation is to be controlled, and radial bonding layers incorporating a dry lubricant and adapted to assemble the ferromagnetic coupling members with one another.

BACKGROUND OF THE INVENTION

This invention relates in general to magnetic coupling devices and has specific reference to improvements in devices of this character such as retarders, brakes, permanent-slip couplers and torque limiters.

Electromagnetic couplers and brakes are already known which comprise, as disclosed and illustrated in the French Patent No. 1,386,474, an annular electromagnet either stationary in the case of a brake or rigid with a driving or driven shaft in the case of a coupler. Registering with this electromagnet and in close vicinity of a front face thereof is a coupling armature of ferromagnetic material which is rotatably solid with a shaft but adapted to slide axially therealong.

Now the operation of this electromagnetic coupling device is characterized by an inconvenience, whether the device is operated as a retarder or as a brake for absorbing a relatively high torque. In fact, the essential requirement in a good-quality brake or retarder is the possibility of rapidly dissipating the heat generated during the slowing down or brake application, and this requirement is scarcely met by the above-mentioned device.

SUMMARY OF THE INVENTION

It is the primary object of the present invention to avoid this inconvenience of known electromagnetic couplers by providing a particularly simple structure affording an efficient ventilation of the assembly.

To this end, the magnetic coupling device according to this invention comprising a fixed or rotatably movable permanent magnet or electromagnet having at least one coupling member of ferromagnetic material which is mounted for axial sliding movement on a supporting plate rigid with the shaft of which the velocity of rotation is to be controlled, is characterized in that the supporting plate of said coupling member is shaped to constitute a fan rotor by itself.

The coupling device according to this invention is advantageous in that the plate supporting the coupling member is adapted to dissipate at a relatively high rate the heat generated during the operation of the device as a retarder or a brake. Furthermore, it is advantageous and economical to manufacture since the aforesaid supporting plate can be machined without difficulty.

In addition, the coils, insulators and other materials incorporated in the structural elements of retarders, brakes or couplers likely to be operated under constant slipping conditions are safely kept at adequate temperature values.

BRIEF DESCRIPTION OF THE DRAWINGS

In order to afford a clearer understanding of this invention and of the manner in which the same may be carried out in practice, reference will be made to the accompanying drawings illustrating diagrammatically by way of example various possible forms of embodiment of this invention. In the drawings:

FIGURE 4 is a further axial longitudinal section showing a coupler-brake according to this invention;

FIGURE 5 is a half cross-sectional view, the section being taken along the line V—V of FIGURE 4;

FIGURE 6 is a longitudinal axial section showing a modified form of embodiment of a coupler-brake according to this invention.

DESCRIPTION OF THE PREFERRED EMBODIMENTS

Figure 1:
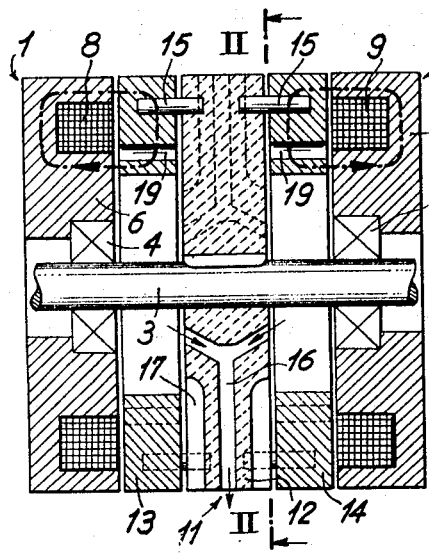
FIGURE 1 is an axial longitudinal section of an electromagnetic retarder constructed according to the teaching of this invention, the section being taken along the line I—I of FIGURE 2.
Figure 2:
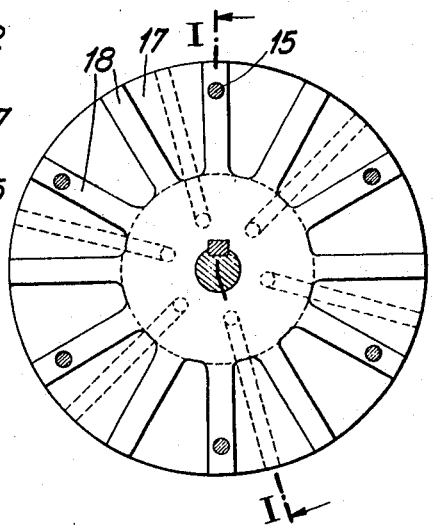
FIGURE 2 is a cross section taken along the line II—II of FIGURE 1.

The electromagnetic coupling device illustrated in FIGURES 1 and 2 comprises two electromagnets 1 and 2 of substantially annular configuration, through which a shaft 3 of which the velocity of rotation must be controlled is rotatably mounted. This shaft is carried by bearings 4 and 5 housed respectively in the annular magnetic circuits 6 and 7 of electromagnets 1 and 2, as shown. These electromagnets 1 and 2 further comprise separate annular excitation windings 8 and 9 fitted in recesses of corresponding shape opening at one of the transverse faces of electromagnets 1 and 2.

Disposed between these electromagnets is a rotor designated generally by the reference numeral 11, which is rotatably solid with shaft 3. This rotor 21 consists essentially of a central supporting plate 12 of non-magnetic material, which is keyed on shaft 3, and of a pair of annular coupling plates 13 and 14 of ferromagnetic material (such as treated steel, sintered magnetic material, friction cast-iron, spiral-coiled metal sheet, etc.), disposed on either side of said central supporting plate 12. The annular coupling plates 13 and 14 are mounted for axial sliding movement on longitudinal pins 15 rigid with the central supporting plate 12.

During the operation of this device as a retarder or brake, the excitation windings 8 and 9 are energized with electric current and the magnetic fields produced by the electromagnets 1 and 2 (of which the magnetic circuits are shown in diagrammatic form by dash-and-dot arrows in FIGURE 1) cause the attraction of the annular coupling plates 13 and 14. These plates are thus urged against the registering front faces of electromagnets 1 and 2 with a force varying as a function of the strength of the excitation current. As a result, friction is produced and attended by an intense release of heat.

To dissipate this heat, the central supporting plate 12 is shaped to act jointly as a centrifugal fan rotor. To this end, this plate 12 has passages or holes formed therein which constitute turbine or fan blades to produce a continuous circulation of cooling air. Thus, radial passages 16 may be formed therein which open at the outer periphery of the central supporting plate 12 and communicate with the front faces thereof in the vicinity of shaft 3, so as to produce a circulation of cooling air as shown by the arrows in FIGURE 1. Besides, the front faces of plate 12 may be machined or moulded to have hollow portions 17 between which the ventilation fan blades 18 are formed.

The coupling plates 13 and 14 are advantageously provided with ventilation holes 19 opening at the frictional faces of these plates. The number and shape of the various ventilation passages and holes are proportional to the power rating of the device.

Figure 3:
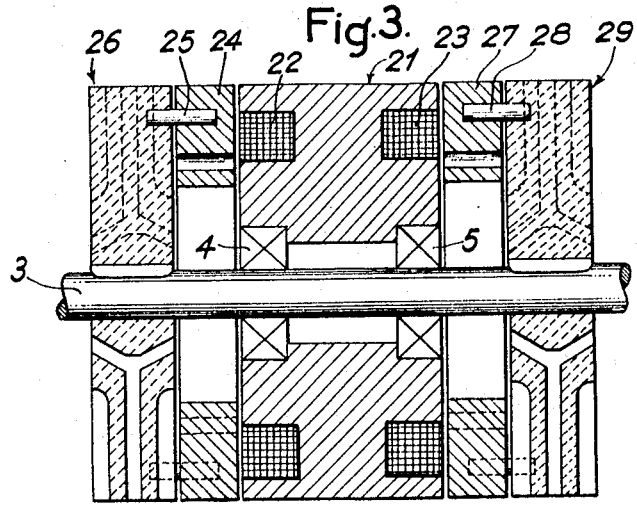
FIGURE 3 is another axial longitudinal section showing a modified form of embodiment of a retarder.

In the alternate form of embodiment of this invention which is illustrated in FIGURE 3, the retarder comprises a twin central electromagnet 21 having two annular excitation coils 22 and 23 housed in recesses of same shape opening at the two front faces of electromagnet 21. The shaft 3 of which the speed is to be controlled extends through the central electromagnet 21 and is carried by bearings 4 and 5.

Registering with the excitation winding 22 is an annular coupling plate 24 of ferromagnetic material mounted for axial sliding movement of pins 25 rigid with a supporting plate 26 of non-magnetic material, keyed on shaft 3. Similarly, registering with the annular excitation winding 23 is an annular coupling plate 27 mounted for axial sliding movement on pins 28 rigid with a supporting plate 29 keyed on shaft 3.

As in the case of the electromagnetic retarder shown in FIGURE 1, the plates 26 and 29 are shaped and machined to constitute centrifugal fans for dissipating the heat generated as a consequence of the frictional contact between the coupling plates 24 and 27 and the stationary transverse faces of electromagnet 21. On the other hand, ventilating holes may be formed through the magnetic circuit of electromagnet 21 to improve the heat dissipation.

Now reference will be made to FIGURES 4 and 5 of the drawings to describe a typical application of the present invention to a coupler-brake assembly. This apparatus comprises a stationary electromagnet 31 having two annular coaxial excitation coils, namely an internal coil 32 and an external coil 33. The device further comprises a driving shaft 34 extending through the electromagnet 31 in which it is mounted by means of bearings 35, and a driven shaft 36 aligned with the preceding one. The driving shaft 34 is rigid with a coupling disk 37 of ferromagnetic material which is advantageously provided with ventilation holes 38. This disk 37 is adapted to revolve in front of a transverse face of electromagnet 31 and its diameter is of a value intermediate the mean diameters of the internal and external excitation coils 32 and 33.

The driven shaft 36 is rigid with a rotor 30 consisting of a supporting plate 39 of non-magnetic material which carries two annular sets of coupling members 41 and 42. These internal coupling members 41 of ferromagnetic material have the shape of annular sectors and are each mounted for axial or longitudinal sliding movement on a pin 43 rigid with the supporting plate. All the pins 43 are disposed at spaced angular intervals about the shaft 36. If desired, these pins 43 may consist of inserts secured to the plate 39, or alterately, as shown in the drawing, they can be moulded integrally with this plate.

The internal coupling members 41 are rigidly bonded or interconnected by intermediate radial connecting layers 44 consisting preferably of a thermosetting resin compound associated with a body having a good coefficient of friction, such as lead, molybdenum, graphite, etc. Thus, the various annular sectors 41 constitute an integral internal annular assembly adapted to slide axially in relation to the supporting plate 39 and registering with, and in close proximity of, the peripheral annular zone of the coupling disk 37 rigid with the driving shaft 34.

The external coupling members 42 have likewise the shape of annular sectors and are mounted separately for axial sliding movement on pins 40 rigid with the supporting plate 39. The various external coupling members 42 are assembled with one another to constitute an annular assembly by means of radial bonding layers or coatings 45 similar to the aforesaid layers 44. The coupling members 42 revolve in front of the external annular zone of electromagnet 31 in which the excitation coil 33 is mounted.

During the operation of the coupler or variable speed device, energizing current is fed to the excitation coil 32 in order to create a coupling magnetic field A (shown by a dash-and-dot arrow in FIGURE 4) of a strength depending on the desired degree of slip. Under these conditions, the annular set of internal coupling members 41 is attracted against the coupling disk 37 with a force varying as a function of the current flowing through the excitation coil 32, and the driven rotor 30 is thus driven at a variable speed. At the surface of the internal coupling members 41 there is permanently a thin layer of dry lubricant affording an exteremely wide range of slip values and preventing a premature wear of the contacting surfaces.

When it is desired to retard on stop the driven shaft 36, current is fed to the external excition coil 33 to produce a coupling magnetic field B through the annular set of external coupling members 42. These are thus attracted by the stationary electromagnet 31 and the driven rotor 30 is retarded or held against motion, according to the value of the magnetomotive force.

As in the preceding cases, the supporting plate 39 and/or the disk 37 are adapted to act as fan means for dissipating the heat generated during the operation of the permanent-slip coupler, or during a brake application.

In the alternate form of embodiment illustrated in FIGURE 6 the driving shaft 34 is solid with an electromagnet 51 carrying an annular excitation coil 52 fitted in a recess of same configuration which opens at one of the transverse faces of this electromagnet 51. This rotary electromagnet 51 is energized with electric current in a known manner through a slip-ring and brush system (not shown).

The apparatus further comprises another stationary annular electromagnet 53 disposed coaxially to and surrounding the electromagnet 51. This complementary electromagnet 53 comprises an annular excitation winding or coil 54.

The driven rotor 30 rigid with shaft 36 is formed as in the example illustrated in FIGURES 4 and 5. In other words the annular set of internal coupling members 41 revolves in front of the excitation coil 52 of the rotary electromagnet 51 to act as a variable-speed coupler. Besides, the annular set of external coupling members 42 revolves in front of the stationary external electromagnet 53 to ensure the retarding and braking functions.

Also in this case the supporting plate 39 and/or the rotary electromagnet 51 are adapted to act as fan means for dissipating the heat generated during the operation of the device as a retarder or as a permanent-slip coupler.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention.

The invention may also be used in the permanent magnet coupling devices and more particularly in the magnetic torque limiters.

What I claim is:

1. A magnetic coupling device comprising a permanent magnet or electromagnet, a shaft of which the rotational speed is to be controlled, a supporting plate of non-magnetic material rigid with said shaft, at least one annular set of coupling members of ferromagnetic material mounted for axial sliding movement on said supporting plate, said annular set of ferromagnetic coupling members being disposed in front of said permanent magnet or electromagnet, and radial bonding layers incorporating a dry lubricant and adapted to assemble the ferromagnetic coupling members with one another.

2. A device as set forth in claim 1, wherein each bonding layer consists of a thermosetting resin compound and a dry lubricant.

3. A device as set forth in claim 1, which operates as a coupler brake, comprising two annular coaxial electromagnets respectively for the permanent-slip coupling and the braking action and two annular coaxial sets of external and internal coupling members disposed respectively in front of said two electromagnets.

4. A device as set forth in claim 3, wherein said annular set of external coupling members registers with a stationary braking electromagnet.

5. A device as set forth in claim 3, which comprises a driving shaft, a ferromagnetic disk solid with said driving shaft and revolving in front of a stationary coupling electromagnet and of said annular set of internal coupling members.

6. A device as set forth in claim 3, which comprises a driving shaft, a rotary electromagnet rigid with said driving shaft and adapted to revolve in front of said annular set of internal coupling members.

References Cited

UNITED STATES PATENTS

| 2,503,704 | 4/1950 | Bessiere. | |
| 2,632,859 | 3/1953 | Bessiere | 188—164 X |
| 2,642,169 | 6/1953 | Hutchinson | 188—164 X |
| 2,684,744 | 7/1954 | Myers. | |

DUANE A. REGER, Primary Examiner

U.S. Cl. X.R.

188—264; 192—84